United States Patent [15] 3,706,905
Alexander [45] Dec. 19, 1972

[54] DEFLECTION COMPENSATION SYSTEM

[72] Inventor: Jack F. Alexander, San Antonio, Tex.

[73] Assignee: Computer Terminal Corporation, San Antonio, Tex.

[22] Filed: May 14, 1970

[21] Appl. No.: 37,322

[52] U.S. Cl........315/21 CH, 315/21 PR, 315/27 GD, 340/324 A

[51] Int. Cl...........................................H01j 29/70

[58] Field of Search...315/27 GD, 24, 21 CH, 21 PR; 340/324 A

[56] References Cited

UNITED STATES PATENTS

| | | | |
|---|---|---|---|
| 3,174,074 | 3/1965 | Massman | 315/27 GD |
| 3,320,469 | 5/1967 | Slavik | 315/24 |
| 3,440,482 | 4/1969 | Lister et al. | 315/24 |
| 3,422,737 | 1/1969 | Bailey, Jr. | 340/324 A |
| 3,428,852 | 2/1969 | Greenblum | 315/26 |
| 3,336,497 | 8/1967 | Osborne | 315/21 CH |

*Primary Examiner*—Benjamin A. Borchelt
*Assistant Examiner*—S. C. Buczinski
*Attorney*—Arnold, White & Durkee, John G. Graham and Darryl M. Springs

[57] ABSTRACT

A system for correcting distortion in the deflection of the beam in a cathode ray tube used to display lines of alphanumeric characters as in a computer terminal unit. Characters are generated one at a time rather than in a TV type raster. This requires a horizontal deflection signal of sawtooth form to create lines, and two separate vertical deflection systems, a major vertical deflection to generate the desired number of lines on the screen, and a minor vertical deflection of much higher frequency to write the characters on a given line. Correction is applied to the horizontal deflection signal and to the minor vertical deflection signal to compensate for the distortion caused by using a short, flat screened tube. The correction signal for both horizontal and vertical may be derived from a single source.

18 Claims, 6 Drawing Figures

DEFLECTION COMPENSATION SYSTEM

In computer time sharing systems, information is often transmitted to and received from a remote computer over telephone lines using a teletype-like unit. Information is entered using a typewriter keyboard, and both transmitted and received information is displayed on a TV type screen. Preferably the terminal contains a memory which stores a given amount of information recently transmitted or received, and the contents of this memory are continuously displayed on the CRT screen. Using a screen of normal persistance, the entire contents of the memory must be rewritten on the screen at perhaps sixty times a second to avoid flicker and provide a bright image. Each time the information is rewritten, the characters must appear in exactly the same place to avoid jitter, which would by annoying to the eye. This imposes a requirement for a precise deflection system for the CRT. Also, a commercially attractive unit should be of small size, so a tube of the short, wide angle type. This creates distortion which is very noticeable in character display where it might not be as objectionable in video display.

A primary feature of this invention is the provision of a CRT type display suitable for alphnumeric characters wherein distortion is a minimum. Another feature is the provision of a simplified but precise technique for compensating both vertical and horizontal distortion in a line by line display of alphanumeric information on a CRT.

Novel features which are believed characteristic of the invention are set forth in the appended claims. The invention itself, however, as well as further features and advantages thereof, may best be understood by reference to the following detailed description of a particular embodiment, when read in conjunction with the accompanying drawings which are a part of this specification, wherein:

Figure 5:
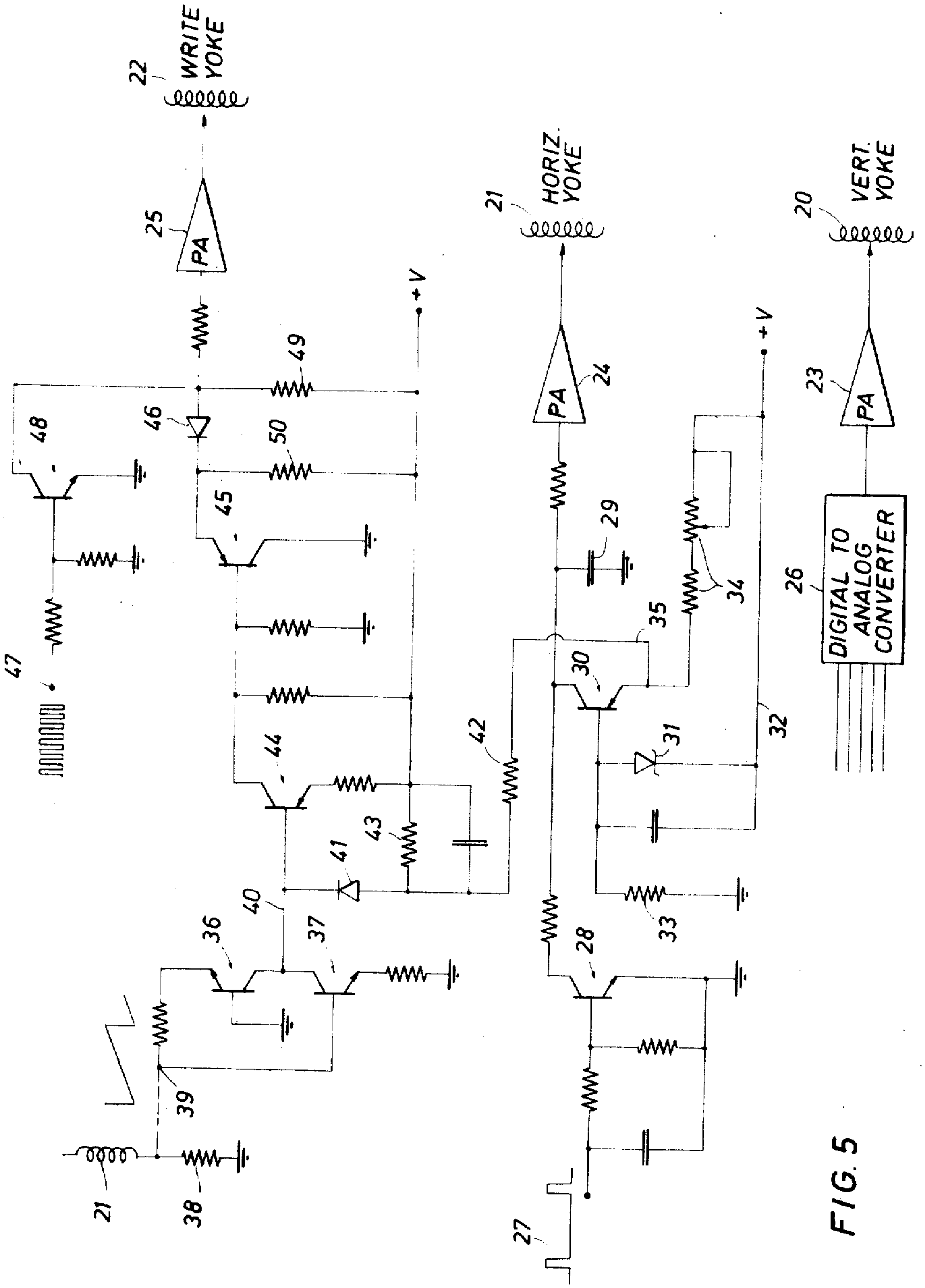
FIG. 5 is an electrical diagram, partly in schematic form and partly in block form, of the deflection compensating system for the invention.

FIGS. 6*a* through 6*e* are graphic representations of voltage waveforms, as a function of time, appearing at various points in the system of FIG. 5.

Figure 1:
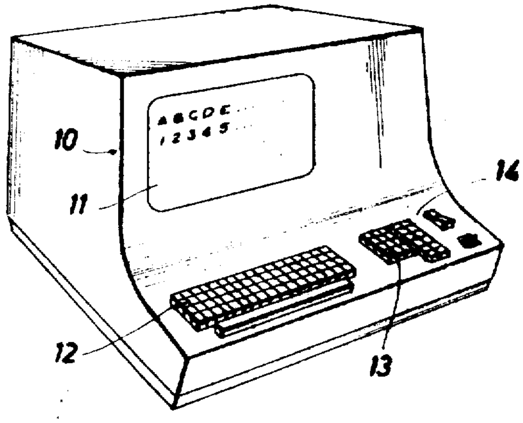
FIG. 1 is a pictorial view of a computer terminal unit in which the invention may be utilized.
Figure 2:
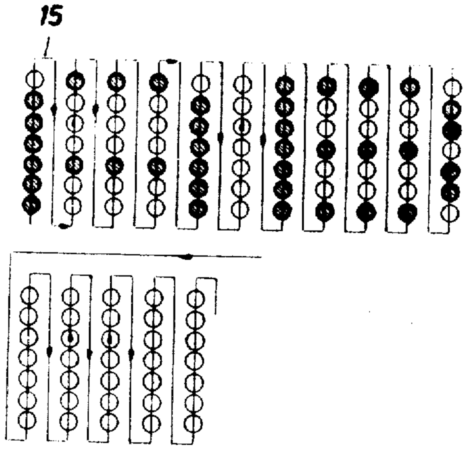
FIG. 2 is a detail view of a portion of the face of the screen in the unit of FIG. 1, showing the pattern of character writing.

Referring to FIG. 1, a computer terminal 10 is shown which is of a type having a cathode ray tube 11 as a display. This device functions as a replacement for a teletype unit, able to transmit and receive information via telephone lines; ordinarily this type of equipment would be used by a customer of computer time-sharing services, at a location remote from the computer. The unit includes a standard typewriter style keyboard 12 along with an adding machine style numerical keyboard 13. Various controls 14 are provided which are not material at this point. When information is being sent, it is merely typed out on the alphanumeric keyboards 12 and 13 and is transmitted at the same time. As each key is depressed, a serial binary code is simultaneously transmitted over a phone line or the like. At the same time, each character is entered on the face of the CRT 11. Incoming information is displayed on the CRT 11 as it is received. Due to the relatively slow rate of transmission permitted on telephone lines, and to the slow and intermittent nature of typing on the keyboard, it will be understood that the scan rate of the CRT will be much faster than characters would be written in real time. In a specific example of a commercial embodiment of the invention, the scan rate of the CRT is 60 frames per second, synched with the line frequency, whereas the maximum transmit or receive rate over telephone lines is one frame every 5 to 10 seconds. Here, the CRT displays 1,800 characters, 72 characters in a line and 25 lines. As seen in FIG. 2, each character is made up of a 7 × 7 dot pattern, 5 × 7 for the alphanumeric character and 2 × 7 for the space between characters. Each character is stored in sequence in an 1,800 character memory. The memory is cycled 60 times per second and the contents displayed on the CRT. The beam intensity is either high or off for each dot of the 5 × 7 matrix, depending upon the information in the memory. The pattern of the beam sweep, as seen in FIG. 2, is such that one character is completed before another is started, and a line is completed before another is started. This method of character generation on the CRT screen is in contrast to a TV type raster, where the beam would sweep all the way across one line and display parts of many letters before completing any. Use of a TV type raster requires a higher speed memory since portions of stored characters must be recalled, rather than an entire character at one time; a given character would be cycled seven times while one whole line was being displayed, rather than only once. Also, alignment of succeeding lines becomes critical to avoid jitter and blurring of the characters.

Figure 3:
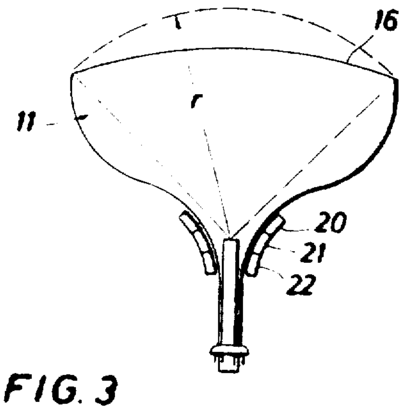
FIG. 3 is a cross sectional view of the CRT in the unit of FIG. 1, illustrating the cause of distortion to be corrected by the invention.
Figure 4:
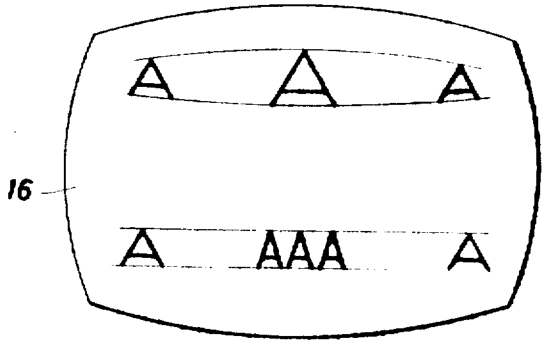
FIG. 4 is a view of a portion of the tube face, in exaggerated form, illustrating the types of vertical and horizontal distortion to be corrected.

Distortion is introduced because the face 16 of the CRT is relatively flat rather than being spherical with a radius r as seen in FIG. 3. Here the center of the beam deflection is between the screen and the center of curvature of the screen, so pincushion distortion occurs. This causes an effect on a given line of characters on the screen 16 as seen in exaggerated form in FIG. 4. The upper line shows the letters vertically distorted, larger in the center than at the edges. There is also horizontal distortion as seen in the bottom line of FIG. 4. The beam moves further, for a given increment of horizontal deflection voltage or current, when near the sides than when near the center. This causes characters to be narrow and squeezed together in the center of the screen, and stretched out on the edges. To overcome this distortion, a compensating circuit is provided according to the invention.

Referring to FIG. 5, a system for generating compensated deflection voltage is shown. The beam in the CRT in this system is deflected by three separate yokes, including a vertical yoke 20, a horizontal yoke 21, and a write yoke 22. Each of these yokes is driven by respective power amplifiers 23, 24, and 25, of conventional form. The major vertical deflection, applied to the yoke 20, is merely a stairstep waveform having 25 discrete values corresponding to the 25 lines of characters to be displayed on the screen 16. These twenty-five values are generated by a digital to analog converter 26. A digital input to the converter 26 is generated in a regular cycle by a timing system. The stairstep repeats every 1/60 sec., so a complete frame of 25 lines is completed 60 times a second. No correction is imposed on the major vertical deflection. A waveform of the major vertical deflection voltage is seen in FIG. 6a.

The horizontal deflection voltage is generated by a circuit seen in FIG. 5. Horizontal timing pulses 27, generated by a timing system, are applied to the base of a transistor 28, and function to turn this transistor full on during the existence of a pulse. The transistor 28 is off completely during the interval between horizontal timing pulses 27. The spacing between timing pulses 27 is the same as the time between steps of the stairstep waveform used for vertical deflection, i.e., one twenty-fifth of 1/60 of a sec. Thus, 25 horizontal sweeps are provided during each frame. The sawtooth waveform used for horizontal deflection is generated by charging and discharging a capacitor 29. The capacitor charges from a constant current source which includes a transistor 30, and then rapidly discharges through the transistor 28 at the end of a horizontal sweep. The capacitor voltage is applied to the input of the power amplifier 24 to generate the current needed to drive the horizontal yoke 21. The constant current source used to charge the capacitor 29 employs a Zener diode 31 connected between the positive supply 32 and a resistor 33, forming a voltage divider which will maintain a constant bias voltage on the base of the transistor 30. A capacitor shunts the Zener to remove transients. The emitter of the transistor 30 is connected to the positive supply 32 through fixed and variable resistors 34 which determine the magnitude of the constant current output of the transistor collector, and thus the charge rate of the capacitor 29. A compensating signal is also applied to this emitter by a line 35.

The horizontal compensation signal is generated by a circuit including a pair of transistors 36 and 37, seen in FIG. 5. These two transistors are alternately turned on by a sawtooth signal derived from a resistor 38 in series with the horizontal deflection yoke 21. The transistor 37 is turned on when this signal is positive, while the transistor 36 is turned on and transistor 37 is off when the signal is negative. As seen in FIG. 6b, the voltage appearing on the line 39 is a sawtooth centered about zero. The transistors 36 and 37 exhibit the usual threshold, and so do not turn on until the base-emitter voltage exceeds about 0.7 volt. Thus, the effect added by the compensating circuit is zero near the midpoint of the horizontal trace, i.e., when the beam is near the center of the screen, but increases toward each end. The junction point 40 of the collectors of the two transistors 36 and 37 is connected through a temperature compensating diode 41 to the positive supply via a resistor 43. The voltage across the resistor 43 is the correction voltage, seen in FIG. 6c. This voltage is applied by a large resistor 42 to the emitter of the constant current generating transistor 30, via the line 35. When the transistors 36 and 37 are both turned off at mid-cycle, the compensation arrangement has no effect. But when one or the other of the transistors 36 and 37 is conductive, the emitter bias of the transistor 30 is reduced, and the constant current available for charging the capacitor 29 is reduced. Thus, the capacitor charges at a slower rate, producing the waveform indicated in FIG. 6d. The effect of this horizontal sweep waveform is to approximate more nearly a constant size of characters regardless of their horizontal position.

Vertical deflection is corrected by another circuit operating from the juncture 40. An inverter stage including a transistor 44 applies the voltage across the resistor 43 to an emitter follower stage including a transistor 45. The output of this determines the value at which a clamping diode 46 will conduct. The write signal is a 950 KHz square wave applied to an input 47. The frequency of this signal is selected to produce vertical deflection at a rate needed to trace the characters as seen by the beam trace 15 in FIG. 2. There will be seven cycles of the trace 15 per character, with 72 characters per line, 25 lines per frame, and 60 frames per second. With time for horizontal and vertical retrace considered, this results in a 950 KHz requirement. This signal is applied to a high gain amplifier stage including a transistor 48 so the vertical write signal appearing across a load resistor 49 would be at a high level, absent clamping. This signal is clamped to provide a square wave, by means of the diode 46 and the transistor 45, along with a resistor 50. The voltage applied to the base of transistor 45 will determine the point at which the diode 46 will start to conduct and this retards further increase in the voltage across the resistor 49. This voltage on the resistor 49 is seen in FIG. 6e, and is applied to the power amplifier 25 to the write yoke 22, producing the vertical trace as seen in FIG. 2. Note that the envelope is larger at the ends than in the middle, correcting the distortion seen in the upper line of FIG. 4.

Figure 6:
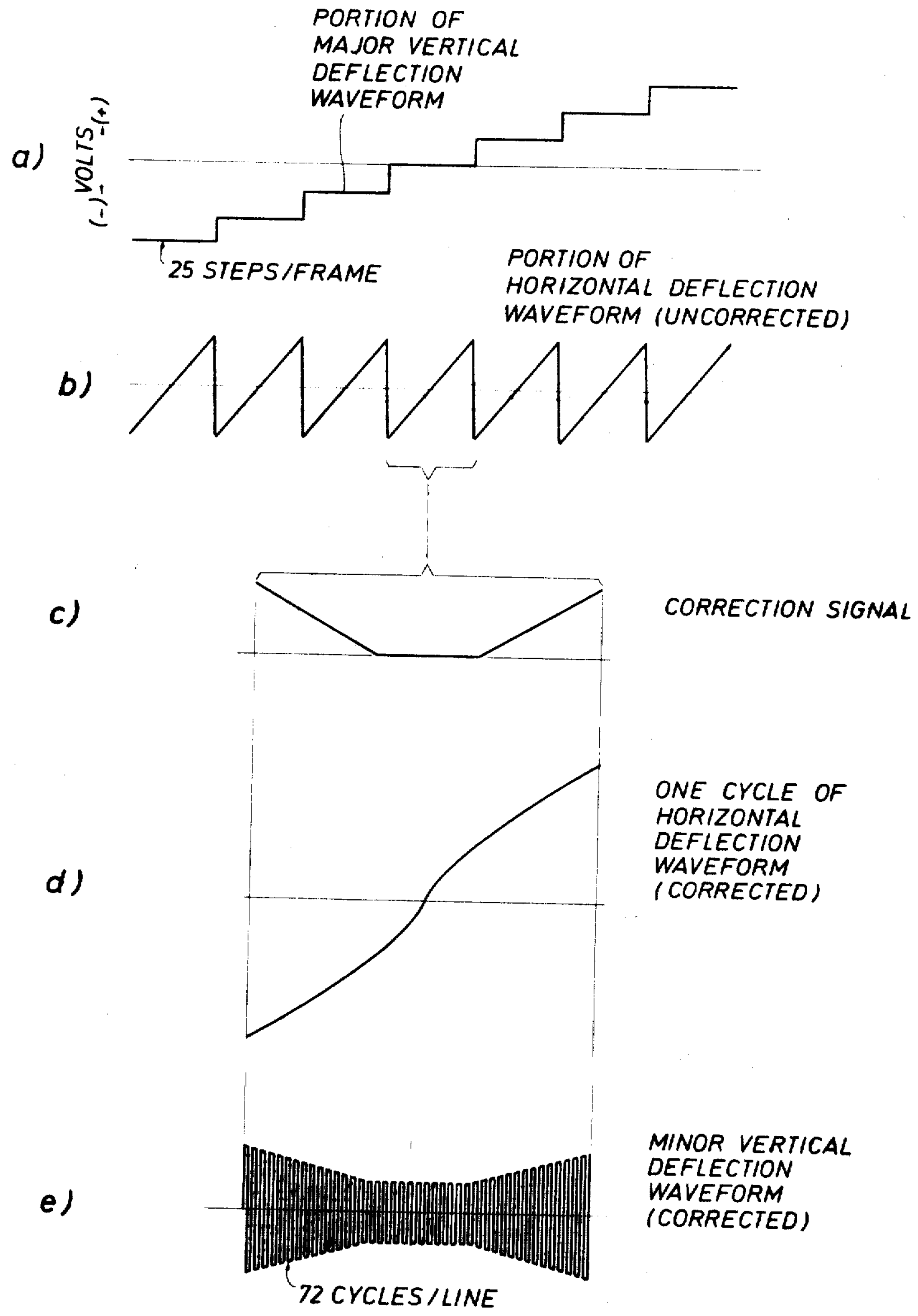

Referring to FIG. 6, the vertical deflection waveform appears at the output of the converter 26 as seen in FIG. 6a, showing only a part of the 25 discrete steps of one frame. The current used to drive the yoke would be of this form also, the yoke voltage appearing quite different. The uncorrected horizontal waveform is shown in FIG. 6b, it being understood that 25 cycles occur each frame. One cycle of the correction signal as it appears across the resistor 43, or on the line 40, is seen in FIG. 6c. The corrected horizontal deflection waveform, as it would appear at the input to the power amplifier 24, is seen in FIG. 6d. Likewise, one cycle of the corrected minor vertical deflection waveform, as it would appear at the input of the power amplifier 25, is seen in FIG. 6e. The amount of correction added to the waveform, for both horizontal and vertical, may be perhaps 20 percent of maximum value, depending upon tube geometry and other factors.

While the invention has been described with reference to an illustrative embodiment, this description is not to be construed in a limiting sense. Various modifications of the disclosed embodiment, as well as other embodiments of the invention, may be apparent to persons skilled in the art upon reference to this description. It is therefore contemplated that the appended claims will cover any such modifications or embodiments as fall within the true scope of the invention.

I claim:

1. A system for correcting deflection of a beam in a cathode ray tube used to display lines of alphanumeric characters or the like, comprising horizontal deflection means for producing a repetitive horizontal sweep signal, first vertical deflection means for repetitively producing a first vertical deflection signal in the form of a stepped waveform providing a sequence of discrete levels corresponding to lines for writing of characters, second vertical deflection means for producing a second vertical deflection signal at a rate much higher than said period of persistance of said discrete levels produced by first vertical deflection means, and at an amplitude much smaller than that produced by the first vertical deflection means, and means for impressing upon said second vertical deflection signal an amplitude correction signal which varies during a horizontal sweep period.

2. A system according to claim 1 wherein means are provided for generating said amplitude correction signal such that it has a waveform which is at or near zero in the middle of a horizontal sweep period and is a maximum at the beginning and end of each such period.

3. A system according to claim 1 wherein the means for generating said amplitude correction signal receives as an input a signal derived from the output of the horizontal deflection means.

4. A system according to claim 1 wherein the horizontal deflection means includes a constant current source charging a capacitor to provide a sweep signal.

5. A system according to claim 1 wherein the repetition rate of the horizontal sweep signal corresponds to the period of persistance of said discrete levels of the first vertical deflection signal.

6. A system according to claim 1 wherein means are provided for imposing upon said horizontal sweep signal an amplitude correction which varies during the horizontal sweep period.

7. A system according to claim 6 wherein the amplitude correction signal for the second vertical deflection signal and the amplitude correction for the horizontal sweep signal are both derived from the same source.

8. A system according to claim 7 wherein said source includes means for generating a correction signal having a waveform which is a minimum in the middle of a horizontal sweep period and is a maximum at the beginning and end of each such period.

9. A system according to claim 8 wherein said means for generating said correction signal receives as an input a signal derived from the output of the horizontal deflection means.

10. A system for correcting deflection of a beam in a cathode ray tube and to display lines of alphanumeric characters or the like, comprising horizontal deflection means for producing a repetitive horizontal sweep signal, including a constant current source charging a capacitor to provide such sweep signal, first vertical deflection means for producing a repetitive vertical deflection signal in the form of a stepped waveform providing a sequence of discrete levels corresponding to lines for writing of characters, the repetition rate of the horizontal sweep signal corresponding to the period of persistence of said discrete levels, second vertical deflection means for producing a vertical deflection signal at a rate much higher than said period of persistance of said discrete levels produced by first vertical deflection means, and at an amplitude much smaller than that produced by the first vertical deflection means, and means for impressing upon said horizontal deflection sweep signal an amplitude correction signal which varies during the sweep period.

11. A system according to claim 10 wherein means are provided for generating a correction signal having a waveform which is at or near zero in the middle of a horizontal sweep period and is at a maximum at the beginning and end of each such period, and said correction signal is used to generate said amplitude correction.

12. A system according to claim 11 wherein the correction signal is coupled to said constant current source to alter the rate of charging of the capacitor.

13. A system according to claim 12 wherein the means for generating a correction signal is controlled by a feedback signal derived from the output of the horizontal deflection means.

14. A system according to claim 13 wherein the constant current source includes a transistor having a fixed base bias and an emitter bias which is a fixed level altered by the correction signal, with the capacitor being in the collector circuit.

15. A system according to claim 14 wherein the means for generating a correction signal includes a pair of transistors connected as an opposing pair with a single output, the input to the transistors being said feedback signal, the output of the transistors being said correction signal.

16. A method of correcting deflection of a beam in a cathode ray tube used to display lines of alphanumeric characters or the like, comprising the steps of:

repetitively charging a capacitor from a constant current source to generate a horizontal deflection sweep signal, generating a correction signal in time synchronization with said horizontal deflection sweep signal, the correction signal being shaped to exhibit a waveform which is at a minimum in the middle of a horizontal sweep period and is a maximum at the beginning and end of such sweep period, and controlling the magnitude of output of the constant current source in accordance with said correction signal.

17. A method according to claim 16 including the steps of generating a first vertical deflection signal to create lines and a second vertical deflection signal to generate characters on the face of the tube, and controlling the magnitude of the second vertical deflection signal in accordance with said correction signal.

18. A method according to claim 17 wherein the correction signal is generated by using as an input a signal related to current in the horizontal deflection yoke of the tube.

* * * * *